United States Patent
Tatsuta et al.

(10) Patent No.: US 6,771,336 B2
(45) Date of Patent: Aug. 3, 2004

(54) OPTICAL DIFFUSION ELEMENT HAVING SELF-FUSED POLYMER PARTICLES FREE OF A BINDER AND DISPLAY DEVICE EQUIPPED WITH THE OPTICAL DIFFUSION ELEMENT

(75) Inventors: Sumitaka Tatsuta, Fujinomiya (JP); Yuichi Wakata, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 62 days.

(21) Appl. No.: 10/043,215

(22) Filed: Jan. 14, 2002

(65) Prior Publication Data

US 2002/0135714 A1 Sep. 26, 2002

(30) Foreign Application Priority Data

Jan. 12, 2001 (JP) .................................... 2001-005749

(51) Int. Cl.$^7$ ...................... G02F 1/1335; C09K 19/02
(52) U.S. Cl. ..................... 349/112; 349/113; 349/183
(58) Field of Search .................. 349/112, 183, 349/113, 86–91; 359/454; 428/1.3, 327

(56) References Cited

U.S. PATENT DOCUMENTS

| | | | | |
|---|---|---|---|---|
| 5,343,317 A | * | 8/1994 | Wada et al. | 349/119 |
| 5,607,764 A | * | 3/1997 | Konno et al. | 428/327 |
| 6,268,961 B1 | * | 7/2001 | Nevitt et al. | 359/488 |
| 6,424,395 B1 | * | 7/2002 | Sato et al. | 349/112 |
| 2002/0012086 A1 | * | 1/2002 | Uchida et al. | 349/112 |
| 2003/0025856 A1 | * | 2/2003 | Takahashi et al. | 349/87 |

* cited by examiner

Primary Examiner—Tarifur R. Chowdhury
(74) Attorney, Agent, or Firm—Young & Thompson

(57) ABSTRACT

Optical diffusion element comprises a layer of polymer particles self-fused together, each polymer particle having a refractivity varying from the center to the periphery thereof and a component for the periphery having a glass transition temperature that is desirably lower than 100° C. The optical diffusion element is desirably provided with an optical transparent layer in contact with the polymer particle layer.

20 Claims, No Drawings

OPTICAL DIFFUSION ELEMENT HAVING SELF-FUSED POLYMER PARTICLES FREE OF A BINDER AND DISPLAY DEVICE EQUIPPED WITH THE OPTICAL DIFFUSION ELEMENT

BACKGROUND OF THE INVENTION

1. Field of the Invention

The present invention relates to an optical diffusion element and a display device, and, more particularly, to an optical diffusion element that can diffuse light forward without causing optical scattering and a reflection type liquid crystal display with an optical diffusion film that can provide the liquid crystal display with an effectively decreased loss of light and a widened viewing angle, a reflection type liquid crystal display with an optical diffusion film that prevents depolarization even though it is put inside the polarization film, and a reflection type liquid crystal display with a thin film optical diffusion element that prevents an occurrence of depolarization and turbulent orientation of liquid crystal and even though it is put within a liquid crystal cell and provides a high optical diffusion effect.

2. Description of the Related Art

Optical diffusion materials are commonly used for light modulation materials, optical elements, optical display elements, etc. Recent days, such an optical diffusion material is widely used for a display element of, for example, a liquid crystal display with an aim to enhance a display quality and improve viewing angle characteristics of the liquid crystal display. The optical diffusion element is conventionally provided in the form of an optically transparent plate formed with fine concavities and convexities or fine irregularities in the surface thereof such as a frosted or obscured glass plate or in the form of a resin film with several microns to tens microns of particles dispersed therein. While, on one hand, these optical diffusion elements can cause scattering of light, they are accompanied by enhanced back scattering of light. This results in a decrease in the amount of light transmission and deterioration of a contrast of an image display surface and, in addition, an occurrence of depolarization, so that these optical diffusion elements are hard to be used for liquid crystal displays that are strongly demand recent days. Further, when these optical diffusion materials are used as a display material, they increase a load of a light source due to a low light transmission.

In order to eliminate these drawbacks of the conventional light diffusion elements, it has been proposed to make use of refraction of light by forming a number of concavities and convexities in the form of a lens array. This technique is however quite troublesome in fabrication of fine concavities and convexities and is inferior in productivity. In addition, when the optical diffusion element comprising concavities and convexities that are sensitive to stains and external impact is installed within a liquid crystal cell of a liquid crystal display, the liquid crystal causes turbulent orientation, as a result of which the liquid crystal display encounters significant deterioration of display quality.

It has further been proposed to make use of fine particles. In particular, there has been proposed a light diffusion element using fine particles as an optical diffusion material. Such a fine particle has a uniform distribution of refraction, namely a refractivity varying from the center to the periphery, for the purpose of using not scattering of light but refraction of light. The optical diffusion element has a secured optical diffusibility while providing somewhat less back scattering.

However, in producing the optical diffusion element, the particles are dispersed in a binder and fused together through the binder. As a result, it is difficult to increase an in-plane number of the particles, so that the optical diffusion element is hard to have a sufficient optical diffusion effect and to make a film thinner.

SUMMARY OF THE INVENTION

It is an object of the present invention to provide an optical diffusion element that can be made in the form of thin film and has secured optical diffusibility.

It is another object of the present invention to provide an optical display device that has a widened viewing angle without being accompanied by a loss of light and an occurrence of depolarization.

The above objects of the present invention are accomplished by an optical diffusion element comprising a layer of polymer particles self-fused together, each polymer particle having a refractivity varying from the center to the periphery thereof. The polymer particles have a mean particle size between approximately 0.5 $\mu$m and 20 $\mu$m. The polymer particle desirably has an outermost component having a glass transition temperature lower than 100° C.

The optical diffusion element may further comprise a transparent layer, desirably formed in a dry-laminating method, in contact with one of opposite sides of the polymer particle layer.

The optical diffusion element is installed in a reflection type display device such as a liquid crystal display. In particular, the optical diffusion element is put within a liquid crystal cell of the liquid crystal display.

DETAILED DESCRIPTION OF THE PREFERRED EMBODIMENT

The following description is directed to an optical diffusion element according to a preferred embodiment of the present invention. In order to produce fine polymer particles each of which comprises more than two components and has an ununiform distribution of the components, it is common to form core-shell latex using conventional emulsification polymerization. In this case, the fine polymer particles thus produced have a particle size of approximately 0.1 $\mu$m which is too small to show an optical diffusibility favorable for the light diffusion element of the present invention. It is necessary for fine polymer particles for the optical diffusion element to have particle sizes between approximately 0.5 $\mu$m to approximately 20 $\mu$m.

In order to produce fine polymer particles having particle sizes between approximately 0.5 $\mu$m to approximately 20 $\mu$m, various types of particles and methods of producing the particles are available. For example, fine particles are prepared as seed particles and polymerized with another monomer. Specifically, the seed particles are formed by polymerizing a first monomer using, for example, soap-free emulsification polymerization. The seed particles are added with a second monomer so as to be polymerized as the seed particles absorb the second monomer. In this manner, the seed particle is provided with a distribution of polymer therein. The second monomer may be added all at once, may be partly added separately over several days, or may be added separately but continually. In this event, although it is not always necessary that the polymer made of the first monomer concentrates at the core and the polymer made of the second monomer concentrates at the shell, the seed particle can be controlled to a desirable morphological constitution by adjusting hydrophilic/hydrophobic properties of the first and second monomers and an adding speed of the second monomer as known from, for example, "New Technology And Development Of Use Of Fine Polymer Particles" published by CMC, 1997 and "Polymer Latex" (New Polymer library 26), by Soichi Muroi and Ikuo Morino, published by Polymer Publishing Society, 1988.

The first seed particle may be used after
a growth to a desired particle size by repeating absorption and polymerization of the first monomer. This manner makes it possible to use a combination of a polymer made of the first monomer in this manner and a polymer made of a second monomer that are substantially different in refractivity. In this instance, each of the first and second monomers may consist of a single type of monomer or more that two types of monomers as long as there is a substantial difference in refractivity between a copolymer made of the more than two types of first monomers and a copolymer made of the more than two types of second monomers.

The utilization can be made of a micro-suspension polymerization method. This method is used in conventional suspension polymerization to produce what is called a Grin lens as known from, for example, "Applied Optics" Vo. 33, 1994. According to the micro-suspension polymerization method, a particle that continuously varies in refractivity can be produced by implementing suspension polymerization of a first monomer M1 added to a water solution of polyvinyl alcohol (PVA) and dropping a little later a second monomer M2 for a polymer that is substantially different in refractivity from a polymer made of the first monomer M1 to the suspension so as to polymerize it. Otherwise, a particle that continuously varies in refractivity can be produced by, after forming a particle by suspension polymerization of a first monomer M1 added to a water solution of polyvinyl alcohol (PVA), adding a polymerization initiator and a second monomer M2 to the suspension of the particles so as to implement polymerization of the particle with the second monomer M2. However, the particles have particle sizes between 0.5 mm to 1.1 mm because they are produced in ordinary suspension polymerization with an aim to form Grin lenses. In order to utilize the particles for forming the optical diffusion element of the present invention, the particles for Grin lens can be adjusted to a desired particle size, for example, between approximately 0.5 $\mu$m to 20 $\mu$m by implementing the micro-suspension polymerization of the particles dispersed by the use of a high share dispersing machine such as a homogenizer.

One of practical examples of the micro-suspension polymerization for forming micron-size particles that have a polymer distribution in a particle such as described in "Journal of Polymer Science: Part A" Vol. 38, 2000, is such that, after polymerization of a first monomer M1 to a polymerization degree of approximately 20%, a reactant solution of the monomers M1 is micro-suspended in an aqueous phase for further promotion of polymerization. A second monomer M2 is dropped in the micro-suspension so as to polymerize the second monomer M2. In this instance, in order to achieve a desired distribution of refractivity, it is necessary to select monomers and polymerization conditions.

There have been known a polymerization method in which a mixture of a first monomer M1 and a polymer made of the first monomer M1 is micro-suspended in an aqueous phase and a second monomer M2 is dipped in the micro-suspension for polymerization and a polymerization method in which, after starting polymerization in a state of a micro-suspension of a first monomer M1, a second monomer M2 is dropped in the micro-suspension for polymerization.

These polymerization methods can incorporate a combination of such first and second monomers that a polymer made of a first monomer M1 and a polymer made of a second monomer M2 are substantially different in refractivity. In this case, each of the first and second monomers may consist of a single type of monomer or more that two types of monomers as long as there is a substantial difference in refractivity between a copolymer made of the than two types of first monomers and a copolymer made of more than two types of second monomers.

In particular, the polymer particles favorable to fabricating the optical diffusion element of the present invention are produced in the process described below.

The polymer particles consist of a first group of monomers and a second group of monomers. A polymer obtained from the first group monomers has a refractivity substantially higher than a polymer obtained from the second group monomers. After preparing a mixture of monomers selected from at least the first and second groups of monomers, respectively, and a polymerization initiator mixed with polymers made of the selected first and second monomers, respectively, the mixture is dispersed in an aqueous medium. Before completion of polymerization during forming polymer particles through a polymerization reaction, a monomer selected from the first group of monomers or the second group of monomers is further polymerized as it is added into the mixture solution so as thereby to form polymer particles of a mean size of approximately 0.5 $\mu$m to approximately 20 $\mu$m.

For forming the polymer particles, at least one monomer is selected from each of the first group of monomers and the second groups of monomers. There is no limitation on the combination of types of selected monomers as long as there is a substantial difference in refractivity between a copolymer obtained from the first group of monomers and a copolymer obtained from second type of monomers. Practically, the difference in refractivity is desirably higher than 0.01, more desirably higher than 0.05 and most preferably higher than 0.1. The polymer particle should have a refractivity that may vary toward the center or the periphery, or be higher at the center and lower at the periphery or vise versa, and preferably continuously varies, increasingly or decreasingly, from the center to the periphery. Particulars of the refractivity of polymer particles obtained from various respective monomers are given in, for example, "Polymer Handbook" (John Wiley & Sons).

In order to provide the polymer particle with such refractivity, employable as the first group of monomers are compounds having at least one of an aromatic ring or a bromine a chlorine atom and a sulfur atom in one molecule and also having at least one ethylene double-bond. The followings are available for the compound: styrene; vinyl naphthalene; chlorostyrene; bromostyrene; chloromethylstyrene; methoxystyrene; methyl styrene; divinylbenzene; phenyl(meta)acrylate; benzilic(meta)acrylate; benzilic(meta)acrylamide; 2-phenylamide(meta)acrylate; 2-(tribromophenyl)ethyl(meta)acrylate; 2-(tribromophenyloxy)ethyl(meta)acrylate; 3-(m-methylbromophenoxi)-2-hydroxipropyl-(meta)acrylate; 2,2-bis(4-(meta)acryloyloxyethoxy-3,5-dibromophenyl) propane; 3-(m-methylchlorophenoxy)-2-hydroxypropyl (meta)acrylate; bis(4-metachryloylthiophenyl)-sulfide; bis (4-vinylthiophenyl)sulfide; bis(β-(meta) acryloyloxyethylthio)xylene; diallyl-phtarate; vinyl chrolide; vinylidene chrolide; benzoic vinyl; chlorobenzoic vinyl; bromo-benzoic vinyl; benzoic allyl; chlorobenzoic allyl; bromobenzoic allyl; and the like. These monomers may be used independently or in combinations of more than two.

Further, employable as the second group of monomers are compounds having none of an aromatic ring or a bromine atom, a chlorine atom and a sulfur atom in one molecule but having at least one ethylene double-bond. The followings are available for the compound: alkyl(meta)acrylate; alkylfluoride(meta)acrylate; (meta)acrylic acids; vinyl acetates; alkylvinyl ethers; and the like. The alkyl group for the alkyl(meta)acrylate is such as methyl, ethyl, n-propyl, i-propyl, n-butyl, I-butyl, t-butyl, hexyl, cyclohexyl, 2-ethylhexyl and the like. The alkylfluoride group for the alkylfluoride(meta)-acrylate is such as (CH2)mCnF2n+1 (where m id 0 to 3 and n is 1 to 19), hexachloroisoprpyl, trichloroisoprpyl and the like. The alkyl group for the alkylvinyl ethers is such as methyl, ethyl, n-propyl, I-propyl, n-butyl, i-butyl, t-butyl, hexyl, cyclohexyl, 2-ethylhexyl and the like.

Among combinations of these groups of monomers, it is desirable from the viewpoint of polymerization property, solubility, availability, refractivity and the like to select one from the group of styrene, substituted styrene, benzyl(meta)acrylate, 2-phenylethyl(meta)acrylate, 2-(tribromophenyl)ethyl(meta)acrylate, 2-(tribromophenyl-oxy)ethyl(meta)acrylate, bis(4- meta-cryroyltiophenyl)sulfide, bis(4-vinyltiophenyl)sulfide and diallylphthalate for the first monomer and one from the group of alkyl(meta)acrylates and alkyl(meta)acrylate fluorides for the second monomer.

Employable as the polymerization initiator are conventional thermal polymerization initiators and conventional photo-polymerization initiators. For example, azo-type thermal polymerization initiators such as 2,2'-azobisisobutyronitrile and 2,2'-azobis (2,4-dimethylvaleronitryl) and peroxide type thermal polymerization initiators such as benzoylparoxides are available.

There are number of compounds available as the photo-polymerization initiator such as compounds of bicynal polyketaldonyl disclosed in U.S. Pat. No. 2,367,660, compounds of acyloin ether disclosed in U.S. Pat. No. 2,448,828, aromatic compounds of acyloin ether with α-hydrocarbon substitute disclosed in U.S. Pat. No. 2,722,521, polynuclear compounds of quinone described in U.S. Pat. Nos. 2,951, 758 and 3,046,127, a combination of dimerized triarylimidazole and p-aminoketon described in U.S. Pat. No. 3,549, 367, compounds of benzothiazole and compounds of trihalomethyl-s-triatriazine described in Japanese Patent Publication No. 51-48516, compounds of trihalomethyl-s-triatriazine described in U.S. Pat. No. 4,239,850, compounds of trihalomethyloxadiazole described in U.S. Pat. No. 4,212, 976.

In addition, the followings are available as the photo-polymerization initiator: aromatic ketone such as benzophenone, camphaquinone, 4,4'bis(dimethylamino) benzophenone, 4-methoxy-4'-dimethylaminobenzophenone, 4,4'-dimethylaminobenzophenone, 4-dimethylaminoacetophenone, benzylanthraquinone, 2-tert-butylanthraquinone, 2-methyl-anthraquinone, xanthone, thiozanthone, 2-chrorrhioxanthone, 2,4-diethylthioxanthone, fluorenon, acrydon, bisacylphosphinoxides such as bis(2,4,6-trimethylbenzoyl)-phenylphosphinoxide, acylohosphinoxides such as Lucirin TPO, α-hydroxy- or αamino-acetophenone, α-hydroxycycloalkylphenylketone and dialxyacetophenone; benzoin and benzoinether such as benzoinmethylether, benzoinethylether and benzoinisoplopylether; dimerized 2,4,6-triallylimidazole such as dimerized 2-(o-chlorophenyl)4,5-diphenylimidazole, dimerized 2-(o-chlorophenyl)-4,5-di(m-methoxyphenyl)imidazole, dimerized 2-(o-fluorophenyl)-4, 5-diphenylimidazole, dimerized 2-(o-methoxyphenyl)-4,5-diphenylimidazole, dimerize 2-(p-methoxyphenyl)-4,5-diphenylimidazole and dimerized 2-(o-chlorophenyl)-4,5-diphenylimidazole; compounds such as described in U.S. Pat. Nos. 3,784,557, 4,252,887, 4,311,783, 4,449,349, 4,410,621 and 4,622,286; polyhalogen compounds such as carbon tetrabromide, phenyl tribromomethylsulfone and phenyl trichloromethylketone; compounds such as described in Japanese Patent Publications Nos. 57-1819 and 57-6069, Japanese Unexamined Patent Publication No. 59-133428, U.S. Pat. No. 3,615,455; s-triazine derivatives having a trihalogene-substituted methyl group such as 2,4,6-tris (trichloromethyl)-s-triazine, 2-methoxy-4,6-bis (trichloromethyl)-s-triazine, 2-amino-4,6-bis (trichloromethyl)-s-triazine, 2-(pmethoxystylyl)-4 and 6-bis (trichloromethyl)-s-triazine described in Japanese Unexamined Patent Publication No. 58-29803; organic peroxides such as methylethylketone peroxides, cyclohexanone peroxides, 3, 3,5-trimethylcyclohexanone peroxides, benzoyl peroxides, ditacyaly-butyl diperoxi-isophthalate, 2,5-dimethyl-2,5-di(benzoilperoxi)hexane, tacyaly-butylperoxibenzoate, a, a'-bis(tacyaly-butylperoxiisopropyl)benzene, dicumilperoxide, and 3,3',4,4'-tetra(tacyalyibutylperoxicarbonyl)benzophenone described in Japanese Unexamined Patent Publication No. 59-189340; azinium salts described in U.S. Pat. No. 4,743,530; organic boron compounds; phenylglyoxalic acid esters such as phenylglyoxalic acid methyl esters; titanosens such as bis($\eta^5$-2,4-cyclopentadien-1-yl)-bis(2,6-difuloro-3-(1H-pyrol-1-yl) phenyl)titanium; iron allene complexes such as $\eta^5$-2,4-cyclopentadienyl-$\eta^6$-cumenyl-iron-(1+)-hexafluorophosphate(1−); diallyliodonium salts such as diphenyliodonium salts; and triallylsulfonates such as triphenylsulfonium.

More detailed examples of compounds employable as the photo-polymarization initiator or other types of photo-polymarization initiators are known from Japanese Unexamined Patent Publication No. 10-45816.

Combinations of more than two compounds may be employed as the photo-polymerization initiator. For example, desirable combinations are a combination of dimerized 2,4,5-triallylimidazole and mercaptobenzoxazole, a combination of 4, 4'-bis(dimethylamino)benzophenone, benzophenone and benzoinmethylether such as described in U.S. Pat. No. 3,427,161, a combination of benzoyl-N-methylnaphtho-thiazoline and 2,4-bis(trichloromethyl)-6-(4'-methoxyphenyl)-triazole, a combination of dialkylamino benzoates and dimethylthioxanthone such as described in Japanese Unexamined Patent Publication No. 57-23602, and a combination of 4,4'-bis(dimethyl-amino)benzophenone, benzophenone and polyhalogenide methyl compound such as described in Japanese Unexamined Patent Publication No. 59-78339.

In the case of the photo-polymerization initiator comprising more than two materials, it is desirable to use a combination of 4,4'-bis(dimethylamino)benzophenone and benzophenone, a combination of 2,4-diethylthioxanthone and 4-dimethylamino benzoethyl, or a combination of 4,4'bis(diethylamino)benzophenone and dimerized 2,4, 5-triallylimidazole.

A chain transfer agent may be employed. There are available a mercaptan type of chain transfer agents such a dodecylmercaptan, octylmercaptan and mercaptoacrtic acid, a sulfide type of chain transfer agents such as dibutylsulfide and dibutyldisulfide, a halogen type of chain transfer agents such as carbon tetrachloride, chloroform, carbon tetrabromide and butylbromide, and an amine type of chain transfer agents such as triethylamine and butylamine. This chain transfer agent may be mixed with the mixture of monomers selected from first and second groups of monomers, polymers made of the selected first and second monomers and a polymerization initiator or with a monomer selected from the first or second groups of monomers, or with the both. There is no limitation on the amount of addition. It is desirable to add the chain transfer agent approximately 0.01 to 30 mol %, more desirably approximately 0.05 to 20 mol %, and most desirably approximately 0.1 to 15 mol %, with respect to the total amount of monomers. It may be allowed to add a solvent into a monomer liquid or a mixture liquid of monomers and polymers if desirable.

Desirable for a dispersing medium for polymerization of the monomers, polymers and a polymerization initiator is water or aqueous mediums. The aqueous medium is predominantly water and contains at least one of a water soluble solvent such as methanol, ethanol, acetone and tetrahydrofuran, a water soluble polymer such as polyvinyl alcohol, poly(sodium acrylate), gelatin, methylhydroxycellulose and polyethylene glycols, and a surface active agent such as dodecyl benzensulfonic acid. These components are selected in order to provide dispersive stability of the particles and to adjust a mean size of the particles in consideration of a combination with applied monomers.

In the particle forming process, a polymer made of a monomer or monomers selected from one of the first and second groups are used together with the selected monomers and a polymerization initiator. The mean size of particles can desirably adjusted by selecting a specific mean molecular weight of the polymer, a weight ratio of the polymer relative to the monomers (a polymer-to-monomer weight ratio) and dispersing conditions (dispersing apparatus, a sped of rotation, a time of dispersion, etc.). Though the combination of these conditions can nor be indiscriminately determined, it is desirable to employ a specific mean molecular weight of approximately 2000 to four hundreds of thousands, more desirably of approximately 2000 to one hundreds of thousands, a polymer-to-monomer weight ratio of 5 to 80:95 to 20, more desirably 5 to 50:95 to 5. For dispersion, conventional dispersing apparatus such as a modiniser and a bead mill may be used under proper dispersing conditions. In this manner, a dispersion mixture of a polymer made of a monomer or monomers selected from one of the first and second groups, the selected monomers and a polymerization initiator is obtained. The mean size of dispersed particles, which has an influence on the size of optical diffusion particles as a final product, is desirable between approximately 0.1 $\mu$m and approximately 40 $\mu$m, more desirable between approximately 0.8 $\mu$m and approximately 10 $\mu$m.

In the polymerizing process, the dispersion mixture is heated when it contains a thermal polymerization initiator or exposed to light when it contains a photo-polymerization initiator. The polymerization process is desirably performed in a nitrogen stream in order to control a halt of polymerization. In the polymerization process, a monomer or monomers selected from another of the first and second groups is added into the dispersion mixture. For example, when a monomer or monomers are selected from the first group in the particle forming process, a monomer or monomers of the second group is added to the dispersion mixture. On the other hand, when a monomer or monomers are selected from the second group in the particle forming process, a monomer or monomers of the first group is added to the dispersion mixture. The monomer is desirably added continually but may be added all at once or little by little at several times.

The dropping of the monomer may be started at the same time of a start of a first step polymerization of the monomer or at an interval of time from a start of a first step polymerization of the monomer and is desirably started before substantial completion of the first step polymerization of the monomer. It can be determined on the basis of a polymerizing time, a state of dispersing liquid, viscosity a residual amount of monomer and the like whether the first step polymerization has substantially been completed. In the case where the determination is made on the basis of a polymerizing time, a guide line of the polymerizing time is approximately 2 to 6 hours, and preferably approximately 2 too 5 hours but depends on other polymerizing conditions. Though there is no limitation on the speed of dropping a monomer, it is desirable to drop the whole amount of monomer within 10 minutes to 3 hours. The polymer particle produced through these steps has refractivity substantially different between the center and the periphery thereof and a mean particle size between approximately 0.5 $\mu$m and approximately 20 $\mu$m, more desirably between approximately 1 $\mu$m and approximately 10 $\mu$m, and most preferably between approximately 1 $\mu$m and approximately 5 $\mu$m. If the mean size of the polymer particles is lower than 0.5 $\mu$m, the polymer particles are not effective in the diffusion of light. On the other hand, if the mean size of the polymer particles is higher than 20 $\mu$m, the polymer particles make a resin film too thick or make the resin film surface uneven. As a result, such polymer particles are undesirable as optical diffusion particles because they are hardly distributable in a liquid crystal cell.

In the polymerization process, the shell of the polymer particle is formed through polymerization of the monomer that is dropped. The glass transition temperature of the polymer forming the shell is desirably lower than approximately 100° C. from the viewpoint of self-fusion between particles formed in the particle forming process, and more desirably lower than approximately 50° C. to approximately 90° C. From these viewpoints, it desirable to employ as the monomer to be dropped in the polymerizing process ethylmetacrylate, cyclohexylmetacrylate, 2-ethylhexylthetacrylate or trifuloroethylmetacrylate.

Optical diffusion element is produced by coating the polymer dispersion on a transparent substrate such as a glass plate, tricellulose acetate film, a polyethylene terephtharate film, a polymethyl metacrylate film, a norubolnene film and a polycarbonate film and drying it. The process of drying the polymer dispersion forms a diffusion layer with the polymer particles self-fused together and closely crowded therein. The term "self-fusion" as used herein shall mean and refer to the state that polymer particles are interfused together in a form of multiple players. Accordingly, in the case where a water soluble polymer is used as a dispersion stabilizing agent in the polymerization process, the term "self-fusion" covers the state that polymers forming shells of polymer particles are heated and interfused together. The optical diffusion layer that is formed by the self-fusion of polymer particles does not cause a light transmission loss due to light scattering and depolarization that are common with optical diffusion layers in which there is produced an interface between outer shells of polymer particles and a binder for interfusing the polymer particles. When the optical diffusion element has no depolarization, the optical diffusion element can be installed on the inside of a polarization film or in the inside of a cell of a liquid crystal display.

The polymer dispersion can be coated on the transparent substrate by a conventional method such as a wire bar coating, an extrusion coating, a doctor blade coating, a spin coating, a slit dye coating and the like. Further, the polymer dispersion may be coated on a temporary support and dried, and then dry-laminated on a transparent substrate.

The optical diffusion element is desirable to have a single layer of the polymer particles and, more desirable to have a plurality of, for example five to ten, layers of the polymer particles, in order to show a diffusion effect. Because the self-interfusion of the polymer particles makes the optical diffusion element to be made in the form of multiple layers without using a binder, the optical diffusion element can comprise optical diffusion layers having a has a high distribution density of the polymer particles. As a result, the optical diffusion element can be provided with a considerably high diffusion effect and can be made thinner, which is effective in order to secure orientation of a liquid crystal. The optical diffusion element is desirable to have a surface as flat and smooth as possible. For making the surface of the optical diffusion element flat and smooth, it is desirable to form an optically transparent layer in contact with the multiple layers of the polymer particles.

Generally, in the case where an optical diffusion layer is formed by self-fused polymer particles, a transparent film coated or laminated on the optical diffusion layer removes whitish luster due to surface scattering that is caused by surface irregularities. Since it is observed through a cross Nicol prism that the surface scattering is somewhat depolarized, it is desirable to laminate the transparent film on the optical diffusion element when the transparent film is required to be placed on the inside of the polarization film. However, it is possibly favorable for the optical diffusion element to place the transparent film on the outside of the polarization film because it rather spontaneously develops an anti-glare effect (a regular reflection prevention effect). The optical diffusion element of the present invention can be applied to both transmission type liquid crystal display and reflection type liquid crystal display. In these cases, the liquid crystal display is realized with an effect of widening a viewing angle but without loosing brightness and putting color gradation balance disorder. These effects are enhanced by using the liquid crystal display together with a collimated light source.

The optical diffusion element may be provided with a hard coat layer, an anti-contamination layer, an anti-reflection layer, anti- glare layer, a flattening layer, an adhesion layer or an anti-static layer.

The following description will be directed to examples of the optical diffusion elements. The present invention is not applied exclusively to these examples. Unless otherwise explained, the term "proportion" shall mean weight proportion. Evaluations were made on example optical diffusion elements and comparative optical diffusion elements. Each element was prepared by coating a polymer particle dispersion on a non-orientated triacetate film so as to have a 10 g/m$^2$ of solid matter and heating and drying the coating at 120° C. in an oven. The element was partly laminated with a transparent dry laminate film (a copolymer having a component ratio in mol % of methacrylic acid:methyl methacrylate:ethyl hexylacrylate:benzilic methacrylate= 28.8:55:11.7:4.5).

The example and comparative elements were evaluated on the basis of the following items in a five point system. A greater point indicates a higher quality.

Film property: The outer appearance of the film is visually observed. The element is evaluated to be more favorable when the film appearance is more uniform.

Back scattering: The film was secured onto a black specular plate and visually observed from the top. The element was evaluated to be more favorable when the film was more black.

Diffusibility: The element was secured onto a film with aluminum coated by evaporation and observed from the top. The element was evaluated to be favorable when the element loses metallic luster of the aluminum coating and looks more white.

Depolarization: The element was secured onto a film with aluminum coated by evaporation and provided with a ¼ λ-plate and a linear polarizing plate secured in this order onto the element so as to cut specular reflection light completely. The element was evaluated to be favorable when looking more black.

EXAMPLE ELEMENT 1

A mixture was prepared by adding a uniform solution of one proportion of polystyrene oligomer (specific mean molecular weight: 5000), 9.0 proportions of styrene, 0.35 proportions of dodecyl mercaptan and 0.21 proportions of 2,2'-azobis(2,4-dimethylvaleronitrile) (V-65 distributed by Wako Jyunyaku Co., Ltd.) to 40.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream so as to start polymerization. After a lapse of 30 minutes from the temperature rise, ten proportions of ethyl methacrylate was dropped into the dispersion taking one hour and the polymerization was continued for four hours. A dispersion of polymer particles was prepared by filtering the reacted liquid through a 100 mesh filter fabric. The mean particle size was 2.4 μm, and the glass transition temperature of the periphery of the polymer particle was 65° C.

EXAMPLE ELEMENT 2

A dispersion of polymer particles was prepared in the same manner as Example 1 except using 4.75 proportions of ethyl methacrylate and 0.25 proportions of methacrylic acid as a substitute for ten proportions of ethyl methacrylate and dropping it into the dispersion taking 30 minutes. The mean particle size was 4.1 μm, and the glass transition temperature of the periphery of the polymer particle was 71° C.

EXAMPLE ELEMENT 3

A mixture was prepared by adding a uniform solution of one proportion of polybenzil methacrylate (specific mean molecular weight: 10,000), 9.0 proportions of benzil methacrylate, 0.20 proportions of dodecyl mercaptan and 0.13 proportions of 2,2'-azobis(2,4-dimethylvaleronitrile) (V-65 distributed by Wako Jyunyaku Co., Ltd.) to 40.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream so as to start polymerization. After a lapse of 30 minutes from the temperature rise, five proportions of ethyl methacrylate was dropped into the dispersion taking 30 minutes and the polymerization was continued for four hours. A dispersion of polymer particles was prepared by filtering the product of the reacted liquid through a 100 mesh filter fabric. The mean particle size was 3.1 μm, and the glass transition temperature of the periphery of the polymer particle was 65° C.

EXAMPLE ELEMENT 4

A dispersion of polymer particles was prepared in the same manner as Example 3 except dropping five proportions of ethyl methacrylate taking 30 minutes immediately after the temperature rise to 60° C. The mean particle size was 2.7 μm, and the glass transition temperature of the periphery of the polymer particle was 65° C.

EXAMPLE ELEMENT 5

A mixture was prepared by adding a uniform solution of 10.0 proportions of benzil methacrylate, 0.20 proportions of dodecyl mercaptan and 0.13 proportions of 2,2'-azobis(2,4-dimethylvaleronitrile) (V-65 distributed by Wako Jyunyaku Co., Ltd.) to 40.0 proportions of 1.25 weight % PVA aqueous solution (PVA-205 distributed by Kurare Co., Ltd.). The mixture was subjected to a dispersing treatment for five minutes in a homogenizer rotating at 3,000 rpm. The resultant dispersion was heated to a temperature of 60° C. while being stirred at 400 rpm in a nitrogen stream, so as to start polymerization. After a lapse of 30 minutes from the temperature rise, five proportions of ethyl methacrylate was dropped into the dispersion taking 30 minutes and the polymerization was continued for four hours. A dispersion of polymer particles was prepared by filtering the product of the reacted liquid through a 100 mesh filter fabric. The mean particle size was 1.9 μm, and the glass transition temperature of the periphery of the polymer particle was 65° C.

Comparative Element 1

A mixture was prepared by adding a uniform solution of 10.0 proportions of styrene, 0.35 proportions of dodecyl mercaptan and 0.21 proportions of 2,2'-azobis(2,4-dimethylvaleronitrile) (V-65 distributed by Wako Jyunyaku Co., Ltd.) to 40.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream, so as to start polymerization. After a lapse of 30 minutes from the temperature rise, five proportions of ethyl methacrylate was dropped into the dispersion taking one hour and the polymerization was continued for four hours. A dispersion of polymer particles was prepared by filtering the product of the reacted liquid through a 100 mesh filter fabric. The mean particle size was 0.10 μm, and the glass transition temperature of the periphery of the polymer particle was 65° C.

Comparative Element 2

A mixture was prepared by adding a uniform solution of 1.0 proportions of polystyrene oligomer (specific mean molecular weight: 5000), 9.0 proportions of styrene, 0.35 proportions of dodecyl mercaptan and 0.21 proportions of 2,2'-azobis(2,4-dimethylvaleronitrile) (V-65 distributed by Wako Jyunyaku Co., Ltd.) to 40.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream so as to continue polymerization for six hours. A dispersion of polymer particles was prepared by filtering the product of the reacted liquid through a 100 mesh filter fabric. The mean particle size was 3.2 μm, and the glass transition temperature of the periphery of the polymer particle was 65° C.

Comparative Element 3

A mixture was prepared by adding a uniform solution of 1.0 proportions of polystyrene oligomer (specific mean molecular weight: 5000), 9.0 proportions of styrene, 10.0 proportions of ethyl methacrylate, 0.35 proportions of dodecyl mercaptan and 0.21 proportions of 2,2'-azobis(2,4-dimethylvaleronitrile) (V-65 distributed by Wako Jyunyaku Co., Ltd.) to 80.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream so as to continue polymerization for six hours. A dispersion of polymer particles was prepared by filtering the product of the reacted liquid through a 100 mesh filter fabric. The mean particle size was 3.70 μm, and the glass transition temperature of the periphery of the polymer particle was 82° C.

Comparative Element 4

A mixture was prepared by adding a uniform solution of one proportion of polybenzil methacrylate (specific mean molecular weight: 10,000), 9.0 proportions of benzil methacrylate, 0.20 proportions of dodecyl mercaptan and 0.13 proportions of 2,2'-azobis(2,4-dimethylvaleronitrile) (V-65 distributed by Wako Jyunyaku Co., Ltd.) to 40.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream so as to continue polymerization for six hours. A dispersion of polymer particles was prepared by filtering the product of the reacted liquid through a 100 mesh filter fabric. The mean particle size was 2.8 μm, and the glass transition temperature of the periphery of the polymer particle was 54° C.

Comparative Element 5

A mixture was prepared by adding a uniform solution of one proportion of polybenzil methacrylate (specific mean molecular weight: 10,000), 9.0 proportions of benzil methacrylate, 5.0 proportions of ethyl methacrylate, 0.20 proportions of dodecyl mercaptan and 0.13 proportions of 2,2'-azobis(2,4-dimethylvaleronitrile) (V-65 distributed by Wako Jyunyaku Co., Ltd.) to 60.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. The resultant dispersion was heated to a temperature of 60° C. while being stirred at 400 rpm in a nitrogen stream so as to continue polymerization for six hours. A dispersion of polymer particles was prepared by filtering the product of the reacted liquid through a 100 mesh filter fabric. The mean particle size was 2.5 μm, and the glass transition temperature of the periphery of the polymer particle was 59° C.

Comparative Element 6

A mixture was prepared by adding a uniform solution of one proportion of polybenzil methacrylate (specific mean molecular weight: 10,000), 9.0 proportions of benzil methacrylate, 0.20 proportions of dodecyl mercaptan and 0.13 proportions of 2, 2'-azobis(2,4-dimethylvaleronitrile) (V-65 distributed by Wako Jyunyaku Co., Ltd.) to 60.0 proportions of 1.25 weight % PVA aqueous solution (PVA-205 distributed by Kurare Co., Ltd.). The mixture was subjected to a dispersing treatment for five minutes in a homogenizer rotating at 10,000 rpm. A uniform solution of 5.0 proportions of ethyl methacrylate, 0.17 proportions of dodecyl mercaptan and 0.11 proportions of 2,2'-azobis(2,4-dimethylvaleronitrile) (V-65 distributed by Wako Jyunyaku Co., Ltd.) was dropped into the dispersion and stirred at a room temperature for two hours. The resultant dispersion was heated to a temperature of 60° C. while being stirred at 400 rpm in a nitrogen stream so as to continue polymerization for six hours. A dispersion of polymer particles was prepared by filtering the product of the reacted liquid through a 100 mesh filter fabric. The mean particle size was 2.7 μm, and the glass transition temperature of the periphery of the polymer particle was 65° C.

The result of the evaluation is shown in the table below. It is apparent from the table that the optical diffusion elements of the present invention are superior in all evaluation items, i.e. the property of film, back scattering, optical diffusibility and depolarization. On the other hand, the optical diffusion elements are inferior in at least one of the evaluation items.

|  |  | Film Property | Back Scattering | Diffusibility | Depolarization |
|---|---|---|---|---|---|
| Example Element 1 | Not Laminated Part | 5 | 4 | 5 | 4 |
|  | Laminated Part | 5 | 5 | 5 | 5 |
| Example Element 2 | Not Laminated Part | 5 | 4 | 5 | 4 |
|  | Laminated Part | 5 | 5 | 5 | 5 |
| Example Element 3 | Not Laminated Part | 5 | 4 | 5 | 4 |
|  | Laminated Part | 5 | 5 | 5 | 5 |
| Example Element 4 | Not Laminated Part | 5 | 4 | 5 | 4 |
|  | Laminated Part | 5 | 5 | 4 | 5 |
| Example Element 5 | Not Laminated Part | 5 | 4 | 5 | 4 |
|  | Laminated Part | 5 | 5 | 5 | 5 |
| Comparative Element 1 | Not Laminated Part | 5 | 5 | 1 | 5 |
|  | Laminated Part | 5 | 5 | 1 | 5 |
| Comparative Element 2 | Not Laminated Part | 2 | 1 | 3 | 1 |
|  | Laminated Part | 2 | 3 | 2 | 1 |
| Comparative Element 3 | Not Laminated Part | 5 | 4 | 3 | 5 |
|  | Laminated Part | 5 | 5 | 1 | 5 |
| Comparative Element 4 | Not Laminated Part | 5 | 4 | 3 | 5 |
|  | Laminated Part | 5 | 5 | 1 | 5 |
| Comparative Element 5 | Not Laminated Part | 5 | 4 | 3 | 5 |
|  | Laminated Part | 5 | 5 | 1 | 5 |
| Comparative Element 6 | Not Laminated Part | 5 | 2 | 5 | 1 |
|  | Laminated Part | 5 | 3 | 3 | 1 |

A reflection type liquid crystal display with a cholesteric color filter incorporated therein and provided with a laminated optical diffusion film produced in the same manner as the Example element 3 that is inserted between a ¼ λ-plate and a liquid crystal cell provides a greatly widened viewing angle as compared with a reflection type liquid crystal display without the laminated optical diffusion film and causes no specular reflection of light that is peculiar to cholesteric liquid crystal, so as to provide favorable visibility. On the other hand, a liquid crystal display with an optical diffusion film that was produced in the same manner as the Example 3 except using polymer particles prepared by mixing an emulsion of a polymer of polyethyl methacrylate (particle size: 0.1 μm) and inserted between a ¼ λ-plate and a liquid crystal cell showed almost no improvement of viewing angle.

It is to be understood that although the present invention has been fully described by way of the preferred embodiments thereof with reference to the accompanying drawings, various variant and other embodiments may occur to those skilled in the art. Unless these variants and embodiment depart from the scope of the present invention, they are intended to be covered by the following claims.

What is claimed is:

1. An optical diffusion element comprising a layer of polymer particles self-fused together, each said polymer particle having a refractivity varying from a center to a periphery thereof;

wherein the layer of polymer particles is free of a binder.

2. An optical diffusion element as defined in claim 1, wherein said polymer particle has an outermost shell component having a glass transition temperature lower than 100° C.

3. The optical diffusion element of claim 2, wherein the optical diffusion element acts to diffuse light passing therethrough.

4. An optical diffusion element as defined in claim 1, and further comprising a transparent layer in contact with one of opposite surfaces of said layer of said polymer particles.

5. An optical diffusion element as defined in claim 1, wherein said transparent layer is formed in a dry-laminating method.

6. An optical diffusion element as defined in claim 1, wherein said polymer particles have a mean particle size between approximately 0.5 μm and 20 μm.

7. The optical diffusion element of claim 1, wherein the layer of polymer particles comprises a plurality of different polymers.

8. The optical diffusion element of claim 1, wherein the layer of self-fused polymer particles comprises a plurality of layers of the polymer particles.

9. The optical diffusion element of claim 8, wherein the layer of self-fused polymer particles comprises at least five and no more than ten layers of the polymer particles.

10. A reflection type liquid crystal display equipped with an optical diffusion element comprising a layer of polymer particles self-fused together, each said polymer particle having a refractivity varying from a center to a periphery thereof;

wherein the layer of polymer particles is free of a binder.

11. A reflection type liquid crystal display as defined in claim 10, wherein said polymer particle has an outermost shell component having a glass transition temperature lower than 100° C.

12. The reflection type liquid crystal display of claim 11, wherein the optical diffusion element acts to diffuse light passing therethrough.

13. A reflection type liquid crystal display as defined in claim 10, wherein said optical diffusion element further comprises a transparent layer in contact with one of opposite surfaces of said layer of said polymer particles.

14. A reflection type liquid crystal display as defined in claim 10, wherein said transparent layer is formed in a dry-laminating method.

15. A reflection type liquid crystal display as defined in claim 10, wherein said polymer particles have a mean particle size between approximately 0.5 $\mu$m and 20 $\mu$m.

16. A reflection type liquid crystal display as defined in claim 10, wherein said optical diffusion element is formed within a liquid crystal cell.

17. The reflection type liquid crystal display of claim 10, wherein the layer of polymer particles comprises a plurality of different polymers.

18. The optical diffusion element of claim 17, wherein the layer of polymer particles comprises polystyrene oligomer, styrene, dodecyl mercaptan, and 2,2'-azobis(2,4-dimethylvaleronitrile).

19. The optical diffusion element of claim 17, wherein the layer of polymer particles comprises polybenzil methacrylate, benzil methacrylate, dodecyl mercaptan, and 2,2'-azobis(2,4-dimethylvaleronitrile).

20. The optical diffusion element of claim 17, wherein the layer of polymer particles comprises benzil methacrylate, dodecyl mercaptan, and 2,2'-azobis(2,4-dimethylvaleronitrile).

* * * * *